Figure 1:
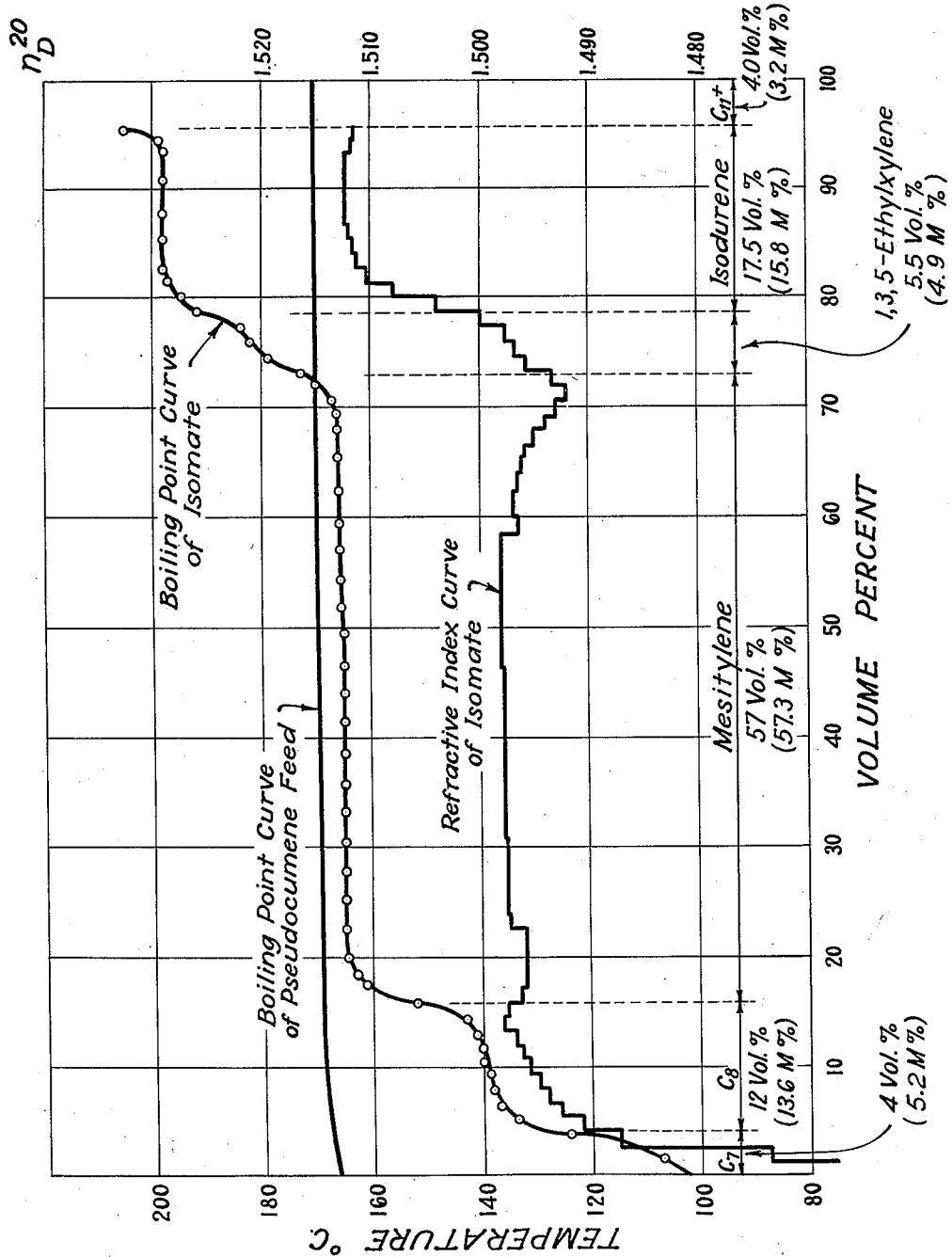

INVENTORS:
David A. McCaulay
Arthur P. Lien
BY
ATTORNEY

Patented Mar. 18, 1952

2,589,621

UNITED STATES PATENT OFFICE 2,589,621

MESITYLENE MANUFACTURE

Arthur P. Lien, Hammond, Ind., and David A. McCaulay, Chicago, Ill., assignors to Standard Oil Company, Chicago, Ill., a corporation of Indiana Application December 15, 1948, Serial No. 65,496

10 Claims. (Cl. 260—668)

This invention relates to a process for the treatment of trimethylbenzenes with liquid HF and BF$_3$. In one aspect, this invention is concerned with a process for the isomerization of trimethylbenzenes, particularly the isomerization of trimethylbenzenes isomeric with mesitylene to produce mesitylene.

One object of this invention is to provide a process for the selective extraction of mesitylene from its mixtures with isomeric trimethylbenzenes. Another object is to provide a process for the high temperature conversion of trimethylbenzenes in the presence of liquid HF and BF$_3$. Still another object is to provide an efficient process for the manufacture of mesitylene by the isomerization of pseudocumene and hemimellitene or hydrocarbon fractions containing the same in the presence of liquid HF and BF$_3$. Yet another object of our invention is to provide a novel process for the treatment and separation of the products produced by the high temperature treatment of trimethylbenzenes with liquid HF and BF$_3$.

Probably the most important source of trimethylbenzenes or of hydrocarbon fractions containing substantial proportions of trimethylbenzenes is the catalytic hydroforming process. In this process a petroleum naphtha, which may be a virgin or cracked naphtha or a mixture of both, is converted to aromatic hydrocarbons by contact with a solid, porous dehydrogenation catalyst at a temperature in the range of about 850° F. to about 1050° F., preferably in the presence of hydrogen. Suitable catalysts are oxides of metals of groups 2 to 6 of the periodic system, particularly oxides of 6th group metals such as chromium and molybdenum, preferably supported by alumina or magnesia. Excellent catalysts can be prepared by depositing about 4 to about 10% of molybdenum oxide upon an activated alumina. Suitable space velocities for hydroforming fall within the range of about 0.2 to about 4 volumes of the liquid charge per hour per volume of catalyst space. About 0.5 to about 8 mols of hydrogen can be charged to the process with each mol of naphtha feed stock. (Note also, G. Armistead, Jr., Oil and Gas J. 45, 17 (August 31, 1946), pp. 85-7 and 100; L. R. Hill et al, Trans. Am. Inst. Chem. Eng. 42, 4 (August 25, 1946), pp. 611-637.)

Trimethylbenzenes are found in considerable concentration in hydrocarbon fractions produced by catalytic hydroforming boiling within the range of about 160 to about 180° C. Concentrates of pseudocumene and hemimellitene are found in hydroformate fractions boiling between about 167 and about 180° C.

While the catalytic hydroforming process is probably the most important source of trimethylbenzene-containing hydrocarbon fractions at the present time, it is not the exclusive source thereof. Thus, hydrocarbon fractions containing trimethylbenzenes can be obtained by fractionation of coal tar naphthas and kerosenes. Also the presence of various trimethylbenzenes has been noted in virgin petroleum naphthas and kerosenes, and trimethylbenzenes fractions can be obtained therefrom by selective solvent extraction and precise fractional distillation. Likewise, selective solvent extraction and fractional distillation of cycle stocks from the cracking of heavy oils with solid cracking catalysts such as silica alumina or silica-magnesia, yield hydrocarbon fractions containing trimethylbenzenes. The high temperature processes for producing trimethylbenzenes such as coking of coal or high temperature cracking of oils yield hydrocarbon fractions containing the trimethylbenzenes in proportions conforming substantially to the thermodynamic equilibrium. The principal component in trimethylbenzene mixtures produced by high temperature processes is pseudocumene which occurs together with relatively smaller proportions of hemimellitene and mesitylene (Wm. J. Taylor et al., J. Res. Nat. Bur. Stds. 37, 117 (Figure 5) (August 1946)).

The process of the present invention provides a means for effecting the substantial conversion of trimethylbenzenes isomeric with mesitylene to mesitylene. Of all the hydrocarbons tested thus far, mesitylene has the highest blending octane number and is among the highest in clear CFR-R octane number. A comparison of the octane number of mesitylene with other aromatic hydrocarbons is shown in the following table:

|           | CFR-R Octane Numbers | |
|-----------|---|---|
|           | Clear | Blending O. N. |
| Mesitylene | Iso-octane + 6 cc. TEL | 171 |
| Cumene    | Iso-octane + 2.1 cc. TEL | 132 |
| o-Xylene  |   | 120 |
| m-Xylene  |   | 145 |
| p-Xylene  |   | 146 |

Comparative antiknock ratings of the individual isomeric trimethylbenzenes in a 3C engine showed hemimellitene to have a very similar performance to pseudocumene and both to be very much inferior to mesitylene.

Mesitylene is isomeric with cumene which is extensively used as a high octane number aviation gasoline component, has similar physical properties, e. g. volatility characteristics, and would thus be a valuabe constituent of safety fuels. Mesitylene has not heretofore been available in concentrated or pure form in commercial quantities at a price consistent with the prices of other aromatic hydrocarbons. The process of the present invention yields mesitylene as a relatively low cost aromatic hydrocarbon concentrate and the process is suitable for large commercial installations. The mesitylene concentrates produced by the present process may be employed in various chemical conversion operations, for example, oxidation in much the same manner as naphthalene or xylenes to produce the corresponding 1,3,5,-benzenetricarboxylic acid, which is suitable for the production of alkyd type resins and plastics. Numerous other uses for mesitylene or mesitylene concentrates produced by the process of the present invention will no doubt suggest themselves to those skilled in the art.

We have found that mesitylene dissolves in liquid HF containing $BF_3$ and that the solution process is attended by a formation of a strong complex of mesitylene with HF—$BF_3$, said complex containing 1 mol each of HF, $BF_3$ and mesitylene. The trimethylbenzenes isomeric with mesitylene also dissolve to some extent in liquid HF containing $BF_3$ but the complexes formed between these trimethylbenzenes, HF and $BF_3$ appear to be much less stable than the mesitylene-HF—$BF_3$ complex. At the relatively high temperatures used in the conversion process of the present invention it appears that the complex of mesitylene with HF and $BF_3$ can exist under the conversion conditions whereas it appears quite certain that the complexes of pseudocumene and hemimellitene with HF and $BF_3$ are decomposed to a very substantial degree under the conversion conditions. The equilibrium in the conversion process of the present invention is, therefore, displaced very largely towards the production of mesitylene and is far different from the thermodynamic equilibrium. It should be understood that we do not choose to be bound by any theory concerning the process of our invention. As will be pointed out in some detail hereinafter, the conversion process of the present invention does yield mesitylene as the preponderant, and at times almost the exclusive, surviving trimethylbenzene in the conversion products.

Briefly, this invention relates to a process for the conversion of trimethylbenzenes or hydrocarbon fractions containing the same by contact with liquid hydrogen fluoride and $BF_3$ to produce conversion products containing a substantial proportion of mesitylene. Usually we employ between about 15 and about 200 volume percent HF based on trimethylbenzenes charged, although much larger amounts of HF, up to about 1,000 volume percent or even more, based on the trimethylbenzenes charged, may be employed. We prefer to employ amounts of HF varying between about 60 and about 120 volume percent, based on the hydrocarbon charging stock. Conversion is generally effected at temperatures between about 150° F. and about 400° F. and, in general, we prefer to employ temperatures between about 170° F. and about 250° F. The conversion is effected at a pressure sufficient to maintain a liquid phase in the reaction zone; it should be understood, however, that a substantial partial pressure of $BF_3$ may exist in the gas phase in the reaction zone, for example, between about 50 and about 400 p. s. i. g.

We have found that the equilibrium distribution of trimethylbenzene isomers in the conversion products is dependent upon the $BF_3$ : trimethylbenzene mol ratio. At $BF_3$ : trimethylbenzene mol ratios substantially below 1, for example 0.1, the ordinary thermodynamic equilibrium is achieved (about 60 percent pseudocumene, 10 percent hemimellitene and 30 percent mesitylene). However, at $BF_3$ : trimethylbenzene mol ratios near 1, the mesitylene concentration in the $C_9$ conversion products approaches 100 percent. Therefore, in the conversion process of this invention we employ $BF_3$ in amounts sufficient to produce a $BF_3$ : trimethylbenzene mol ratio of at least about 0.75, for example between about 0.75 and 1.25, although we may employ even higher ratios, such as 2 or more. Boron trifluoride, however, is a relatively expensive chemical and ordinarily it will be desired to use the minimum amount necessary to achieve the desired results. Also, as the $BF_3$ : trimethylbenzene (molar ratio) increases above 1, the operating pressure in the reaction zone increases tremendously because of the high vapor pressure of the free $BF_3$.

In the following tabulation of examples, m-xylene was disproportionated by treatment with liquid hydrogen fluoride and $BF_3$ to produce mesitylene and the effect of the $BF_3$ : trimethylbenzenes mol ratio on the equilibrium $C_9$ product distribution was noted. In Example 1 the minimum calculated $BF_3$ : trimethylbenzenes mol ratio was 1.3, assuming 100 percent disproportionation of the xylene charging stock. Since only about half the xylene was converted it will be apparent that the actual mol ratio of $BF_3$ : trimethylbenzenes was somewhat greater than 2. It will be noted that in Example 1 the sole surviving trimethylbenzene was mesitylene. In Example 2 where the mol ratio of $BF_3$ : trimethylbenzenes was substantially below 1 it will be noted that the concentration of mesitylene in the $C_9$ reaction products was reduced to 60 percent.

Examples 3 and 4 were studies of the trimethylbenzenes isomerization equilibrium in the presence of liquid HF and $BF_3$. Example 3 indicates that the isomerization equilibrium was not attained at 212° F. with a small amount of $BF_3$, although a considerable amount of disproportionation occurred even under these relatively mild conditions. In Example 4 it was found that the addition of toluene suppressed the disproportionation of mesitylene to produce $C_{10}$ and higher molecular weight aromatic hydrocarbons and that at 250° F., the thermodynamic equilibrium was readily attained even in the presence of only a small amount of $BF_3$. As will be shown in the example which follows it is possible to avoid the thermodynamic equilibrium concentration of mesitylene, which is relatively low and to produce substantially 100 percent mesitylene in the $C_9$ conversion products by using a sufficient amount of $BF_3$ in the reaction zone to provide a $BF_3$ : trimethylbenzenes mol ratio of about 1 or more.

TABLE 1

| Example | 1 | 2 | 3 | 4 |
|---|---|---|---|---|
| Feed | m-xylene | m-xylene | mesitylene | mesitylene |
| grams | 259 | 260 | 345 | 122 |
| mols | 2.44 | 2.45 | 2.88 | ² 1.0 |
| HF, weight (g) | 300 | 300 | 400 | 243 |
| BF₃, weight (g) | 109 | 13 | 20 | 8 |
| mols | 1.6 | 0.19 | 0.295 | 0.118 |
| Temperature, °F | 212 | 250 | 212 | 250 |
| Mols BF₃/C₉ (Assuming 100% Conv. of Xylene) | 1.3 | 0.16 | 0.1 | 0.12 |
| Reaction time, min | 30 | 30 | 30 | 30 |
| Product Distribution, Vol. Per Cent: | | | | |
| Toluene | 17 | 13 | 1 | 32 |
| Xylenes | 57.5 | 67 | 8 | 22 |
| Trimethylbenzenes | 25.5 | 20 | 77 | 46 |
| C₁₀ and higher aromatics | | | ¹ 14 | |
| Composition Trimethylbenzene, Vol. Per Cent: | | | | |
| 1,3,5-Trimethylbenzene | 100 | 60 | 78 | 40 |
| 1,2,4-Trimethylbenzene | Trace | 40 | 22 | 60 |
| 1,2,3-Trimethylbenzene | do | Trace | Trace | Trace |

¹ Mixture. Durene is the predominant isomer.
² Toluene, 84 g.

Example 5

ISOMERIZATION OF PSEUDOCUMENE

The pseudocumene employed was obtained by precise fractional distillation of a sample of Eastman-Kodak Company trimethylbenzenes in a fractionating column containing the equivalent of 100 theoretical plates. The fraction boiling at 167–171° C. was taken as pseudocumene. This fraction contained 90 percent of pseudocumene, the main impurities being close-boiling paraffinic hydrocarbons. Pseudocumene (215.5 g.), liquid hydrogen fluoride (280 g.) and BF₃ (122 g.) were charged to a stirring autoclave and agitated at 180° F. for 30 minutes. The contents of the autoclave were then withdrawn into 400 cc. of water and the resultant hydrocarbon layer was separated from the aqueous layer. The recovery of hydrocarbons was 92.6 weight percent of the hydrocarbons charged. The hydrocarbon product was fractionated in a fractionating column containing the equivalent of 30 theoretical plates with the results shown in Figure 1.

The composition of the C₉ product fraction shows that mesitylene was substantially the sole isomerization product of pseudocumene. This demonstrates that the thermodynamic C₉ isomeric equilibrium distribution, in which the pseudocumene-mesitylene ratio is about 60 to 40, can be shifted by one mol of BF₃ per mol of feed stock to give a product containing practically 100% mesitylene in the C₉ fraction.

Some disproportionation of pseudocumene also occurred, as shown in the table below, giving the following overall product distribution:

*Composition of pseudocumene isomate, mol percent*

| | |
|---|---|
| Toluene | 5.2 |
| Xylenes | 13.6 |
| Mesitylene | 57.3 |
| Ethylxylenes | 4.9 |
| Isodurene | 15.8 |
| C₁₁ and higher aromatics | 3.2 |
| | 100.0 |

The ethylxylene may have been formed from an ethyltoluene impurity in the feed or may have resulted from cracked paraffins alkylating an aromatic.

The composition of the C₁₀ product fraction boiling at 198° C. is remarkable in that it consists of only one isomer, namely isodurene. In Example 3, in which mesitylene was isomerized and disproportionated in the presence of small amounts of BF₃, the C₁₀ product fraction was a mixture of which the predominant isomer was durene. Thus it has been shown, among the tetramethylbenzenes as well as the trimethylbenzenes, that the ordinary thermodynamic isomeric equilibrium distribution can be shifted toward the formation of one isomer. Therefore, one of the by-products of the isomerization of pseudocumene, in the presence of an equimolar amount of BF₃, is a substantially pure isodurene which should be of great value as a pure chemical.

In cases where it is desired to suppress the disproportionation reaction, we have shown in Example 4 that this can be done by adding toluene to the reaction mixture. Thus, the net disproportionation of trimethylbenzenes in Example 4 at the relatively elevated temperature of 250° F. was less than that obtained at 180° F. in the absence of toluene. Xylenes or a mixture of toluene and xylenes may be used in lieu of toluene. Another possibility is the use of a lower temperature, about 160° F., at which rate of disproportionation relative to isomerization may be decreased considerably.

Figure 2:
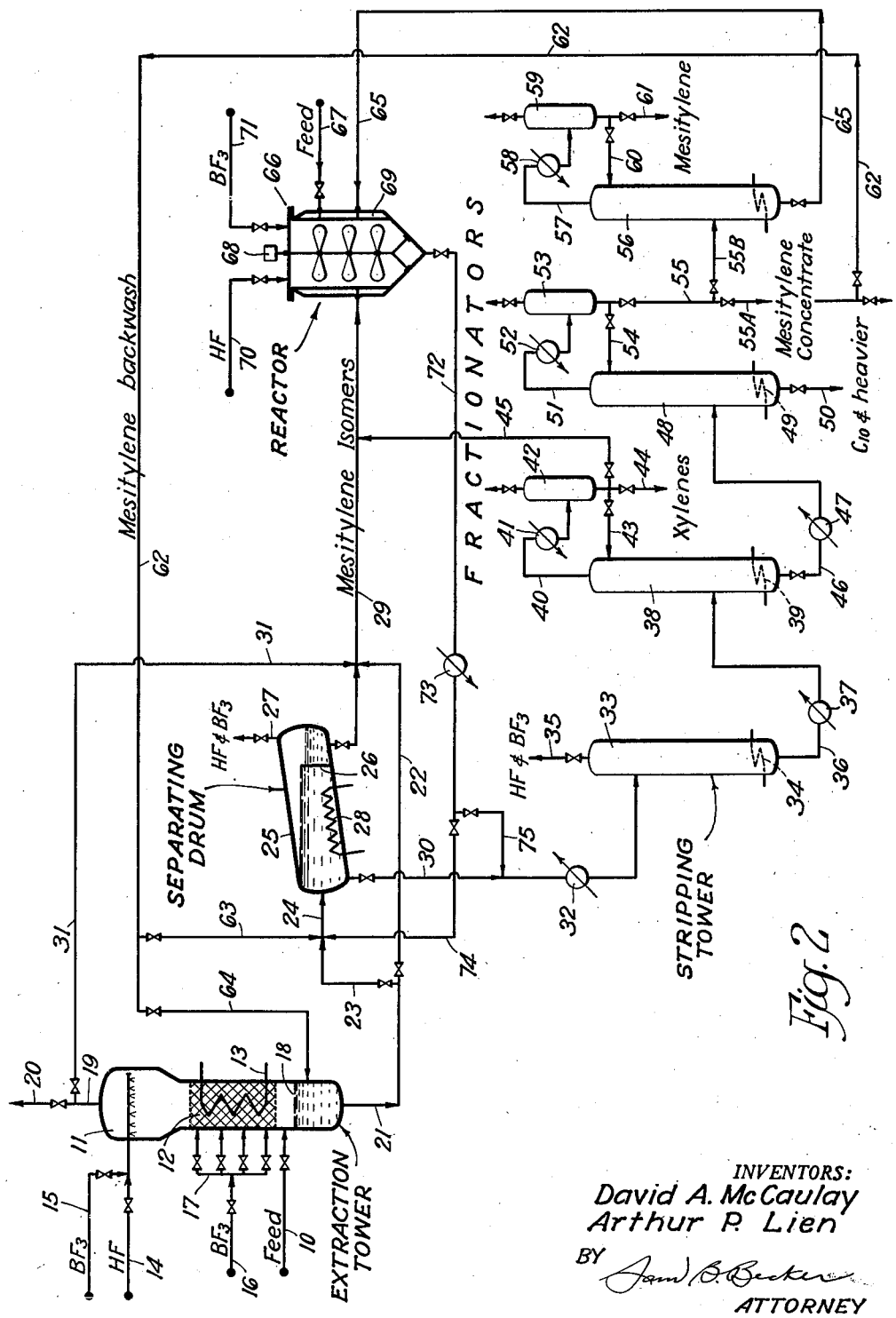

In order further to illustrate the conversion process of the present invention, reference is made to Figure 2. A trimethylbenzenes fraction, suitably a hydroformate fraction boiling between about 160 and about 180° C., preferably about 167 to 180° C., may be charged through line 10 into the lower portion of an extraction tower 11, provided with suitable packing material 12, e. g. shaped fragments of carbon, Monel metal and the like, and a cooling coil 13 to remove the heat of absorption. Liquid hydrogen fluoride is introduced into tower 11 through valved line 14. BF₃ may be introduced into tower 11 through valved lines 15 and 14 and/or through valved line 16 and manifold 17.

The conditions of extraction may be adjusted to dissolve substantially all the aromatic hydrocarbons contained in the charge entering tower 11 through line 10. For this purpose the feed stock is contacted with liquid hydrogen fluoride in an amount between about 0.75 and about 7.5 volumes per volume of trimethylbenzenes contained in the feed stock and with BF₃ in an amount at least equimolar with the aromatic hydrocarbons contained in the feed stock, for example, between about 1 and about 3 mols of BF₃ per mol of aromatic hydrocarbons. Extraction of aromatic hydrocarbons from non-aromatic hydrocarbons in the feed stock to tower 11 can be effected at temperatures between about 0° F. and about 150° F., preferably at temperatures between about 60° F., and about 100° F. The extraction period may vary between about 1 and about 30 minutes and usually falls in the range of about 5 to about 15 minutes. Sufficient pressure is maintained in the extraction zone to provide liquid phase operating conditions. As a result of the extraction operation a raffinate layer of undissolved, predominantly saturated hydrocarbons forms as an upper liquid layer in the extraction zone and is separated by a meniscus 18 from the extract layer of aromatic hydrocarbons dissolved in liquid HF and BF₃ which is present in the lower end of tower 11. The raffinate is discharged from tower 11 through valved lines 19 and 20 and the extract solution is discharged through valved line 21.

As has been indicated above, mesitylene is more readily converted into a complex with liquid HF and BF₃ and the resulting complex is more stable than the complexes of pseudocumene and hemimellitene with HF and BF₃. Therefore, by employing a mol ratio of BF₃ : mesitylene in tower 11 between about 0.5 and about 1.5, preferably between about 0.8 and about 1.2, depending on the mesitylene content, it is possible to effect substantial selective dissolution of mesitylene from the feed stock in preference to pseudocumene and hemimellitene. The mol ratio of BF₃ to mesitylene ideally should be about 1. The mol ratio of BF₃ to trimethylbenzenes can be varied between about 0.2 and about 0.8, depending on the mol fraction of mesitylene in the trimethylbenzenes. In that case the extract layer leaving tower 11 through line 21 is a mesitylene concentrate in liquid HF and BF₃ and the raffinate phase leaving tower 11 through valved line 19 contains considerable amounts of pseudocumene and hemimellitene in addition to saturated hydrocarbons. As will be pointed out in detail hereinafter, the raffinate layer from tower 11 containing pseudocumene and hemimellitene may be employed as the charging stock to the catalytic conversion operation.

Usually, the C₉ aromatic hydrocarbon fractions derived from hydroforming, coal tar distillation, and the like contain considerable proportions of ethyltoluenes in addition to trimethylbenzenes. We have observed that an ethyl group attached to an aromatic nucleus disproportionates very readily in the presence of liquid hydrogen fluoride and BF₃. Thus, we have noted that ethyl group disproportionation from an aromatic nucleus in the presence of liquid HF and BF₃ proceeds substantially quantitatively at temperatures as low as 0° C. When ethyltoluenes are contained in the feed stock to tower 11 considerable ethyl group disproportionation may occur to produce toluene and C₁₁ aromatic hydrocarbons. At ordinary temperatures, we have observed that toluene forms no complex with liquid HF and BF₃ and is therefore substantially insoluble in these reagents. Toluene will therefore be rejected with the raffinate leaving tower 11 through line 19. The C₁₁ aromatic hydrocarbons produced by disproportionation of ethyltoluenes will comprise diethyltoluenes and ethyl-trimethylbenzenes which will dissolve to a substantial extent in the liquid hydrogen fluoride and BF₃ in tower 11.

The extract layer passing through valved line 21 may be passed through valved line 23 and line 24 into drum 25 provided with a weir 26 and a valved vent line 27. In the case where the extraction operation in tower 11 is conducted to effect preferential extraction of mesitylene from its isomers as well as from saturated hydrocarbons, drum 25 will serve primarily as a surge tank. The principal feed stock to the isomerization or conversion operation in that case will be the raffinate passing overhead from tower 11 through valved line 31, thence to line 29 leading to reactor 66. However, the extraction of mesitylene from other trimethylbenzenes is ordinarily not 100 percent selective. By heating the liquid contents in drum 25 by means of heating coil 28, BF₃ may be flashed off through valved line 27 in an amount sufficient to reduce its concentration in the liquid phase to a value between about 0.2 and about 0.9 mol per mol of contained aromatic hydrocarbons, preferably about 0.6 to about 0.75 mol per mol of contained aromatic hydrocarbons; upon cooling to a temperature between about 0° F. and about 150° F., e. g. 80° F., the liquid contents separate into two immiscible phases, the upper phase flowing over weir 26 into the upper end of the drum. The upper liquid phase in drum 25 comprises a substantial proportion of pseudocumene and hemimellitene which may be discharged through valved line 29 to pass to the conversion zone as will be described hereinafter. The solution in the lower end of drum 25 comprises mesitylene, relatively small amounts of mesitylene isomers and in some cases diethyltoluenes and ethyl-trimethylbenzenes dissolved in liquid HF and BF₃. This solution may be removed from the lower end of drum 25 through valved line 30 for treatment to remove HF and BF₃ and for fractionation as will be described hereinafter.

When the extraction conditions in tower 11 are adjusted to dissolve substantially all the aromatic hydrocarbons in the feed stock in the liquid HF—BF₃ and to leave only saturated hydrocarbons as the raffinate, it may be desired to pass the entire extract phase through line 21 and valved line 22 into line 29 and thence to reactor 66 for conversion. A desirable alternative is to pass the extract solution into drum 25 and to vaporize BF₃ therefrom to reduce the concentration of BF₃ in the liquid contents of drum 25 to a value substantially below 1 mol per mol of aromatic hydrocarbons therein contained, for example to a value between about 0.8 and about 1.2 mols of BF₃, say 1.0 mol of BF₃, per mol of contained mesitylene. As a result of BF₃ removal in drum 25, the homogeneous liquid solution therein separates into two distinct liquid phases, viz. a hydrocarbon phase comprising pseudocumene and hemimellitene which collects in the upper portion of drum 25 and may be withdrawn through valved line 29 for conversion in reactor 66 as hereinafter described, and a lower phase which is a solution of hydrocarbons comprising mesitylene in liquid hydrogen fluoride and BF₃.

The solution of mesitylene and other hydrocarbons in liquid hydrogen fluoride and BF₃ which is withdrawn from the lower end of drum 25 through valved line 30 is passed through a heat exchanger 32 into the upper portion of a stripping tower 33 provided with a heating coil 34 in the lower portion thereof. The operating conditions in tower 33 are adjusted to vaporize substantially all the HF and BF₃ contained in the solution charged to the tower; suitable operating conditions in tower 33 are a top temperature between about 150° F. and about 250° F., a bottom temperature between about 250° F. and about 450° F. and pressures between about 0 and about 100 p. s. i. g. The HF and BF₃ passing overhead from tower 33 through valved line 35 may suitably be condensed and recovered for use in the extraction process in tower 11 and/or for reaction in the reactor 66. The stripped hydrocarbons pass from the bottom of tower 33 through line 36 and heat exchanger 37 into a fractionating tower 38 provided with reboiler coil 39. Xylenes initially present in the feed or formed as by-products in the operation in tower 11 are vaporized and pass overhead through valved line 40 into a condenser 41, thence to an accumulator drum 42 whence a portion is recycled through valved line 43 as reflux for tower 38 and the net xylenes production may be withdrawn through valved line 44. If desired all or part of the xylenes may be withdrawn through line 45 to pass to line 29, thence to reactor 66 in order to minimize the disproportionation of trimethylbenzenes to form $C_{10}$ aromatics and higher boiling products. Toluene and/or xylenes (from any source) may be introduced into reactor 66 in amounts between about 10 and about 80 volume percent, preferably between about 40 and about 50 volume percent based on the trimethylbenzenes charged to the reactor.

Bottoms are withdrawn from tower 38 through valved line 46 whence they pass through heat exchanger 47 into a fractionating tower 48 provided with a reboiler coil 49. The operating conditions in tower 49 are adjusted to cause the fractional distillation of trimethylbenzenes and to produce a liquid bottoms fraction comprising $C_{10}$, $C_{11}$ and higher molecular weight aromatic hydrocarbons. Suitable operating conditions are an overhead temperature between about 325° and about 330° F. and bottom temperature between about 355° and about 365° F. at about 1 atm. A bottoms fraction comprising $C_{10}$ and higher aromatic hydrocarbons is withdrawn from tower 48 through valved line 50. A trimethylbenzenes vapor fraction comprising principally mesitylene passes overhead from tower 48 through valved line 51 and condenser 52 into an accumulator drum 53, whence a portion is recycled through valved line 54 to reflux tower 48 and the net trimethylbenzenes distillate (a mesitylene concentrate) can be removed as product through valved line 55A; alternatively the distillate may be passed from line 55 into valved line 55B, thence into a superfractionating tower 56. If desired, a portion of the net mesitylene production may be withdrawn from valved line 55A through valved line 62, thence through valved line 63 and line 24 to serve as a backwash in drum 25 and/or through valved line 64 to serve as a backwash in extraction tower 11.

The operating conditions in tower 56 are adjusted to separate mesitylene as a distillate from a relatively minor quantity of bottoms fraction of mesitylene isomers, viz., pseudocumene and hemimellitene. A vapor fraction consisting essentially of mesitylene passes overhead from tower 56 through valved line 57 and condenser 58 into an accumulator drum 59 whence a portion is recycled through valved line 60 as reflux to tower 56 and the net mesitylene production may be withdrawn through valved line 61. Trimethylbenzenes isomeric with mesitylene are withdrawn as a liquid bottoms fraction from the lower end of fractionating tower 56 through valved line 65 for passage to reactor 66.

Also, the charging stock to reactor 66 may be a crude $C_9$ aromatic fraction from hydroforming or a trimethylbenzenes fraction from any other source and may be charged to reactor 66 through valved line 67. Other charging stocks for reactor 66 may be a concentrate of trimethylbenzenes isomeric with mesitylene derived from the extraction tower 11 and passing from line 31 into line 29 and/or derived from the upper hydrocarbon phase in drum 25, prepared by the methods described in detail above.

The conversion of trimethylbenzenes in accordance with our process to produce a $C_9$ aromatic product fraction comprising principally mesitylene, usually between about 75 and 100 percent mesitylene, is effected by agitating the hydrocarbon charging stock in reactor 66 by means of an agitator 68 or an equivalent device at a temperature between about 150° F. and about 400° F., suitable temperature control being maintained in reactor 66 by a heating jacket 69. Liquid HF may be introduced into reactor 66 as needed through valved line 70 and BF₃ may be introduced through valved line 71. The hydrocarbon charging stock in reactor 66 is intimately contacted with between about 40 and about 200 volume percent of liquid hydrogen fluoride and with at least about 1 mol of BF₃ per mol of trimethylbenzenes in the feed. At higher temperatures within the reaction temperature range, for example temperatures of about 180° F. or more and with BF₃:trimethylbenzenes mol ratios of 1 or more, more or less disproportionation may occur as a side reaction in the isomerization of trimethylbenzenes to mesitylene, but disproportionation may be reduced by use of short reaction periods or by operating in the presence of added toluene or xylenes. Sufficient pressure is maintained in reactor 66 to maintain the hydrocarbon feed, HF and a substantial proportion of the BF₃ in the liquid phase. Suitable reaction times may vary between about 3 and about 60 minutes.

Upon completion of the desired reaction in reactor 66 the reaction mixture is withdrawn through valved line 72 into cooler 73, whence all or a portion may be passed through valved line 74 into line 24 and drum 25 and all or the remainder may be passed through valved line 75 into line 30, thence into HF—BF₃ stripping tower 33, and subsequent fractionation in towers 38, 48 and 56, as described above. In the case where all or part of the reaction mixture from reactor 66 is passed into drum 25, it is treated to separate a portion of the BF₃ to produce two distinct liquid phases as hereinbefore described, viz., an upper hydrocarbon phase comprising a substantial proportion of mesitylene isomers, which are recycled to reactor 66 through valved line 29 and a solution comprising mesitylene in liquid HF and BF₃ which is withdrawn from drum 25 to valved line 30 and passed into the fractionation system as hereinbefore described.

Although Figure 2 describes a continuous extraction operation, the process of our invention, as Example 5 clearly shows, can be operated batchwise. It can also be operated in a plurality of stages employing either batch or continuous extraction equipment. Various conventional types of contacting equipment may be used in lieu of that shown in Figure 2. Instead of settling drums, centrifuges may be used. The above and other known means of contacting employed in solvent extraction processes and in processes wherein liquid catalysts are contacted with hydrocarbons may be employed to practice the process of our invention.

Although HF and especially BF₃ are relatively expensive reagents and would of necessity be recovered in any large commercial application of the process of this invention, in small scale operations the recovery of these reagents might be considered immaterial. When the recovery of HF and BF₃ as such is not required, the distillation and stripping operations illustrated in Figure 2 may be dispensed with. As an alternative to distillation of the extract phase (or of the reaction mixture derived from reactor 66), said phase may be mixed with water, alkaline or acid solutions, or the like which dissolve the HF and BF₃, leaving a supernatant hydrocarbon phase which may then be recovered. A desirable acidic solution with which to treat the extract phase is the azeotropic HF—H₂O solution, which becomes enriched in HF upon contact with the extract phase and from which the HF in excess of the azeotropic amount can thereafter be readily recovered by distillation. An alternative would be to distill free HF and BF₃ from the extract phase, following which the residual firmly bound BF₃—HF-mesitylene complex could be treated with water or aqueous alkaline or acidic solutions to liberate the mesitylene bound in said complex. In place of the aqueous solutions mentioned above, one may employ organic compounds capable of forming complexes with HF and BF₃ and which are capable of displacing mesitylene from its complex with HF and BF₃, e. g., organic compounds having a more basic (greater electron-donating) capacity than mesitylene. Such organic compounds include various amines, sulfur compounds, e. g., alkyl bisthioethers, and oxygenated organic compounds such as phenol, alkyl ethers, ketones, aldehydes, etc.

This application is a continuation-in-part of our application for Letters Patent, Serial No. 46,135, filed August 25, 1948, now U. S. Patent 2,564,073 issued August 14, 1951.

Having thus described our invention, what we claim is:

1. In a process for the preparation of mesitylene by liquid-phase isomerization of a trimethylbenzene isomeric therewith in the presence of liquid hydrogen fluoride and BF₃, the improvement which comprises effecting said isomerization at a temperature between about 150° F. and about 400° F. in the presence of at least about 15 percent by volume of liquid hydrogen fluoride and at least about 0.75 mol of BF₃ per mol of said trimethylbenzene, whereby a reaction product is produced containing mesitylene in a proportion greater than the equilibrium proportion thereof in the absence of BF₃ and in a proportion equivalent to at least about 75 percent of the trimethylbenzenes contained in said reaction product, and thereafter separating mesitylene from said reaction product.

2. The process of claim 1 wherein said trimethylbenzene isomeric with mesitylene is pseudocumene.

3. The process of claim 1 wherein said isomerization is effected in the presence of between about 10 and about 80 volume percent of toluene, based on said trimethylbenzene isomeric with mesitylene.

4. The process of claim 1 wheren said isomerization is effected in the presence of between about 10 and about 80 volume percent of xylenes, based on said trimethylbenzene isomeric with mesitylene.

5. In a process for the preparation of mesitylene by liquid-phase isomerization of a trimethylbenzene isomeric therewith in the presence of liquid hydrogen fluoride and BF₃, the improvement which comprises effecting said isomerization at a temperature between about 150° F. and about 400° F. in the presence of between about 15 and 200 percent by volume of liquid hydrogen fluoride and between about 0.75 and 2 mols of BF₃ per mol of said trimethylbenzene, whereby a reaction product is produced containing mesitylene in a proportion greater than the equilibrium proportion thereof in the absence of BF₃ and in a proportion equivalent to at least about 75 percent of the trimethylbenzenes contained in said reaction product, and thereafter separating mesitylene from said reaction product.

6. In a process for the preparation of mesitylene by liquid-phase isomerization of a trimethylbenzene isomeric therewith in the presence of liquid hydrogen fluoride and BF₃, the improvement which comprises effecting said isomerization at a temperature between about 150° F. and about 180° F. in the presence of at least about 15 percent by volume of liquid hydrogen fluoride and at least about 0.75 mol of BF₃ per mol of said trimethylbenzene, whereby a reaction product is produced containing mesitylene in a proportion greater than the equilibrium proportion thereof in the absence of BF₃ and in a proportion equivalent to at least about 75 percent of the trimethylbenzenes contained in said reaction product, and thereafter separating mesitylene from said reaction product.

7. A process for the isomerization of a trimethylbenzene isomeric with mesitylene, which process comprises contacting said trimethylbenzene in an isomerization reaction zone with between about 15 and about 1,000 volume percent of liquid hydrogen fluoride and between about 0.75 and about 2 mols of BF₃ per mol of said trimethylbenzene at a temperature between about 150° F. and about 400° F. under pressure sufficient to maintain the liquid phase and for a period of time sufficient to effect substantial isomerization, thereafter withdrawing at least a portion of the reaction mixture from said isomerization reaction zone, withdrawing BF₃ from said mixture in an amount sufficient to reduce the BF₃ concentration in said mixture to a value between 0.8 mols and about 1.2 mols per mol of mesitylene which is present in said mixture, stratifying the resultant mixture into a solution comprising HF, BF₃ and mesitylene and a predominantly hydrocarbon stratum comprising a trimethylbenzene isomeric with mesitylene, and separating mesitylene from said solution.

8. A process for the isomerization of a trimethylbenzene isomeric with mesitylene, which process comprises contacting said trimethylbenzene with between about 60 and about 120 volume per cent of liquid hydrogen fluoride and with BF₃ in an amount sufficient to afford a partial pressure of BF₃ between about 50 and about 400 p. s. i. g. at an isomerization reaction temperature in excess of about 150° F. but not in excess of about 180° F. under a pressure sufficient at least to maintain a liquid phase and for a period of time sufficient to effect substantial isomerization, and thereafter separating a C₉ isomate containing at least about 75% of mesitylene from the resultant reaction products.

9. A process for the isomerization of a trimethylbenzene isomeric with mesitylene, which process comprises contacting said trimethylbenzene in an isomerization reaction zone with between about 15 and about 1,000 volume percent of liquid hydrogen fluoride and between about 0.75 and about 2 mols of $BF_3$ per mol of said trimethylbenzene at a temperature between about 150° F. and about 400° F. under pressure sufficient to maintain the liquid phase and for a period of time sufficient to effect substantial isomerization, thereafter withdrawing at least a portion of the reaction mixture from said isomerization reaction zone, withdrawing $BF_3$ from said mixture in an amount sufficient to reduce the $BF_3$ concentration in said mixture to a value between 0.8 mol and about 1.2 mols per mol of mesitylene which is present in said mixture, stratifying the resultant mixture into a solution comprising HF, $BF_3$ and mesitylene and a predominantly hydrocarbon stratum comprising a trimethylbenzene isomeric with mesitylene, and recycling said hydrocarbon stratum to said isomerization reaction zone.

10. A process which comprises contacting a hydrocarbon fraction containing an ethyltoluene, mesitylene and a trimethylbenzene isomeric with mesitylene with liquid hydrogen fluoride in an amount between about 0.75 and about 7.5 volumes per volume of said trimethylbenzene and with $BF_3$ in an amount between 0.2 and about 0.8 mol per mol of total trimethylbenzenes and about 1 mol per mol of mesitylene contained in said hydrocarbon fraction at a temperature between about 0° F. and about 150° F. under a pressure sufficient to maintain the liquid phase, separating the resultant mixture into a first liquid layer consisting essentially of hydrocarbons comprising toluene produced by the disproportionation of said ethyltoluene and comprising a trimethylbenzene isomeric with mesitylene, and a second immiscible liquid layer which is a solution comprising HF, $BF_3$ and mesitylene, separating said liquid layers, contacting said first liquid layer with liquid hydrogen fluoride in an amount between about 40 and about 200 volume percent, based on the volume of trimethylbenzene contained in said first liquid layer, and with $BF_3$ in an amount between about 0.75 and about 1.25 mols per mol of trimethylbenzene contained in said first liquid layer at a temperature between about 150° F. and about 400° F. under a pressure sufficient to maintain the liquid phase and for a period of time sufficient to effect substantial isomerization, and thereafter separating mesitylene from the resultant reaction products.

ARTHUR P. LIEN.
DAVID A. McCAULAY.

REFERENCES CITED

The following references are of record in the file of this patent:

UNITED STATES PATENTS

| Number | Name | Date |
|---|---|---|
| 2,425,559 | Passino et al. | Aug. 12, 1947 |